United States Patent [19]

Murata

[11] Patent Number: 5,779,015
[45] Date of Patent: Jul. 14, 1998

[54] ONE-WAY CLUTCH HAVING IMPROVED SPRING ACCOMODATING CHAMBER

[75] Inventor: Mitsuhiro Murata, Anjo, Japan

[73] Assignee: Denso Corporation, Kariya, Japan

[21] Appl. No.: 791,785

[22] Filed: Jan. 29, 1997

[30] Foreign Application Priority Data

Feb. 7, 1996 [JP] Japan .................. 8-020984

[51] Int. Cl.[6] .................................. F16D 41/064
[52] U.S. Cl. .................................. 192/42; 192/45
[58] Field of Search ............... 192/42, 45; 188/82.84

[56] References Cited

U.S. PATENT DOCUMENTS

| | | | |
|---|---|---|---|
| 4,895,234 | 1/1990 | Fujino | 192/42 |
| 5,318,160 | 6/1994 | Oomi et al. | 192/45 |
| 5,471,890 | 12/1995 | Shiga et al. | 192/45 X |
| 5,706,700 | 1/1998 | Takagi et al. | 192/45 X |

FOREIGN PATENT DOCUMENTS 61-48012  10/1986  Japan .

*Primary Examiner*—Richard M. Lorence
*Attorney, Agent, or Firm*—Cushman Darby & Cushman IP Group of Pillsbury Madison & Sutro LLP

[57] ABSTRACT

A one-way clutch having an outer member and an inner member accommodates a plurality of rollers and compression coil springs therein. A plurality of seats are formed on the outer member to receive one end of the coil springs respectively thereon and each seat is formed in a circular-arc-shaped curve on a radially outer side of each seat. A projection directed toward the roller is formed on a radially inner side of each seat. Each compression coil spring is sandwiched between the outer curved surface and the inner curved surface. With the radially outer side of the seat being in the circular arc shape, the part of the outer member between the seat and the peripheral surface of the outer member can be formed thick, thus preventing a stress from concentrating thereon. The inner curved surface formed by the projection prevents the compression coil spring from interfering with the inner member.

9 Claims, 3 Drawing Sheets

ONE-WAY CLUTCH HAVING IMPROVED SPRING ACCOMODATING CHAMBER

BACKGROUND OF THE INVENTION

1. Field of the Invention

The present invention relates to a one-way clutch which transmits rotations of a motor or the like in one direction in general and more particularly to a one-way clutch for use in a starter.

2. Description of Related Arts

In recent years, there is a growing demand for the development of a compact and light-weight starter to manufacture light cars having an improved loading performance. A starter having a speed reduction mechanism and a compact motor which provides a large driving torque is known.

In order to manufacture the compact starter, it is necessary to reduce its entire axial length and the diameter of the motor. The reduction in the diameter of the motor necessitates the diameters of strength-required component parts of the starter to decrease. Further, a high reduction gear ratio provided by the reduction mechanism causes a high impulsive force to be applied to the strength-required component parts of the starter. With the increase in the impulsive force and the decrease in the diameters of the strength-required component parts, a large stress is applied to thin portions of the strength-required component parts. Consequently, there is a high possibility that the strength-required component parts are damaged.

In particular, in a starter for starting an engine having a large inertia, a high speed reduction ratio of the reduction mechanism causes a great impulsive force to be generated when a pinion of the starter engages a ring gear of the engine flywheel and when the pinion collides the ring gear during cranking of the engine.

A one-way clutch for use in the starter is one of the strength-required component parts thereof, thus serving to transmit a motor torque to the pinion during the cranking of the engine and preventing an engine torque from being transmitted to the motor at the time of overrunning which occurs after the engine starts.

FIG. 6 shows the construction of a conventional one-way clutch. The conventional one-way clutch 100 comprises an inner member 101 formed integrally with a pinion; an outer member 103 positioned around the periphery of the inner member 101 and rotating together with an output shaft 102; a plurality of rollers 105 accommodated in a tapered cam chamber 104 formed on the inner peripheral surface of the outer member 103; and a plurality of compression coil springs 106, each of which urges the corresponding roller 105 in the taper-off direction (shorter radial length side) of the cam chamber 104.

The strength of the one-way clutch 100 is determined by torques to be transmitted thereto, the radial thickness of the outer member 103, and the length of the contact between the rollers 105 and the inner member 101 as well as the outer member 103.

As described above, with an increase in the degree of torques impulsively applied to the one-way clutch 100, a stress is increasingly applied thereto. Thus, it is necessary to make the diameter of the outer member 103 larger or make the length of the contact between the rollers 105 and the inner member 101 as well as the outer member 103 larger to prevent a large stress from being applied to the one-way clutch 100. This way of solving the problem necessitates the one-way clutch 100 to be large even though the starter is provided with the motor having a small diameter.

Further, in the conventional clutch, when the roller 105 moves to the shorter-length side of the cam chamber 104 as shown by the two-dot chain line in FIG. 6, one end of the compression coil spring 106 is incapable of moving along the seat formed on the inner peripheral surface of the outer member 103. As a result, the axis of the spring 106 is incoincident with the center of the roller 105. That is, because one end of the spring 106 is incapable of moving along the seat, it is incapable of urging the roller 105 stably.

SUMMARY OF THE INVENTION

The present invention accordingly has an object of the present invention to provide a compact and light-weight one-way clutch.

According to the present invention, an outer curved surface directed radially inwardly and having a large curvature is formed at the outer side of a seat defined on the inner peripheral surface of a clutch outer member so as to prevent a stress from concentrating on the part, of the outer member, between the seat and the periphery of the outer member. This construction allows the particular part of the outer member to be formed thick, and thus, allows the outer member to be compact and have a high degree of strength. Thus, a compact and light-weight one-way clutch can be manufactured.

In an overrunning state, a compression coil spring is compressed due to the movement of a roller to a radially longer-length side of a cam chamber. At this time, the outer curved surface applies a force to one end, of the compression coil spring, in contact with the seat in a direction in which one end of the compression coil spring is moved toward a clutch inner member.

A projection directed toward the roller is formed at the inner side of the seat which is in contact with one end of the compression coil spring. Thus, even though the outer curved surface applies a force directed in the above-described direction to the compression coil spring, the projection prevents one end of the compression coil spring from moving toward the inner member. Accordingly, the compression coil spring is prevented from interfering with the inner member.

The compression coil spring does not interfere with the inner member, there is no possibility that a frictional force is generated between the compression coil spring and the inner member and that the compression coil spring is caught between the roller and the inner member as well as the outer member. Thus, there is no possibility that the one-way clutch is damaged.

Preferably, the outer curved surface and the inner curved surface both in the shape of a circular arc are so positioned that one end of the compression coil spring is sandwiched therebetween. When the compression coil spring is expanded due to the movement of the roller toward a radially shorter-length side of the cam chamber, one end of the compression coil spring moves toward the outer side of the seat along the seat, whereas when the compression coil spring is contracted due to the movement of the roller toward the radially longer-length side of the cam chamber, one end of the compression coil spring moves toward the inner side of the seat along the seat. That is, irrespective of the position of the roller which moves in the cam chamber in the circumferential direction of the one-way clutch, the axis of the compression coil spring is coincident with the center of the roller, thus urging the roller stably and uniformly.

BRIEF DESCRIPTION OF THE DRAWINGS

Other objects, features and advantages of the present invention will become more apparent from the following description when read with reference to the accompanying drawings, in which.

DETAILED DESCRIPTION OF THE PRESENTLY PREFERRED EMBODIMENTS

A one-way clutch according to embodiments of the present invention will be described below with reference to the drawings.

|First Embodiment|

Figure 1:
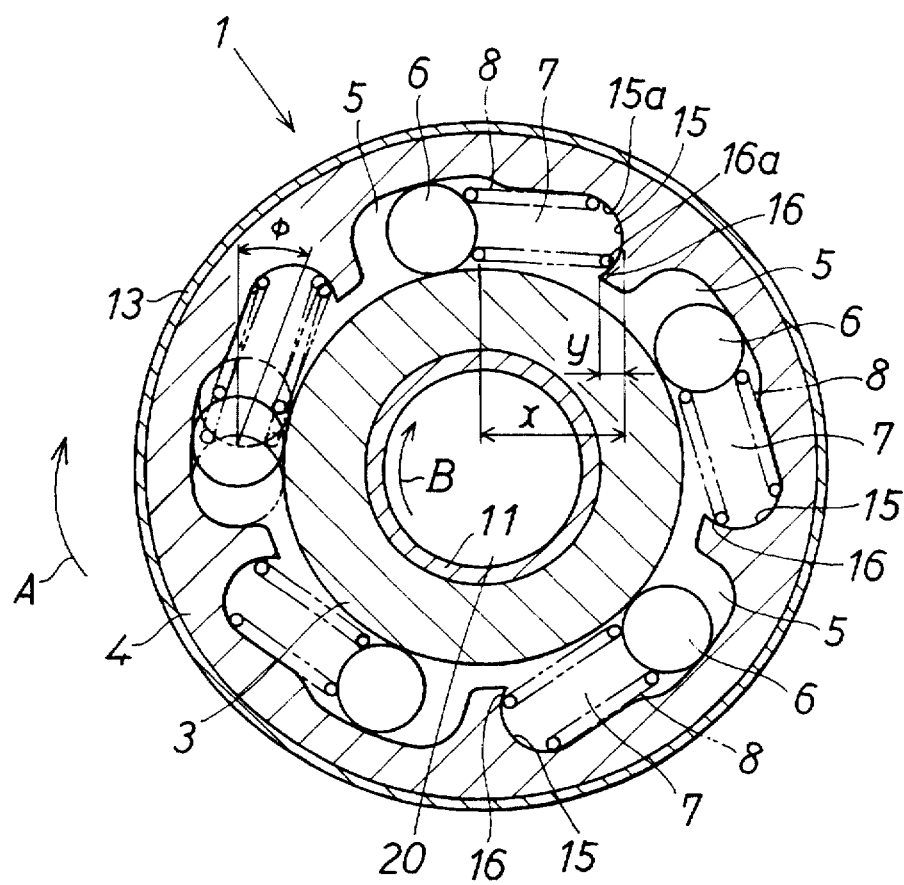
FIG. 1 is a sectional view of a one-way clutch taken vertically to the axis according to a first embodiment.
Figure 2:
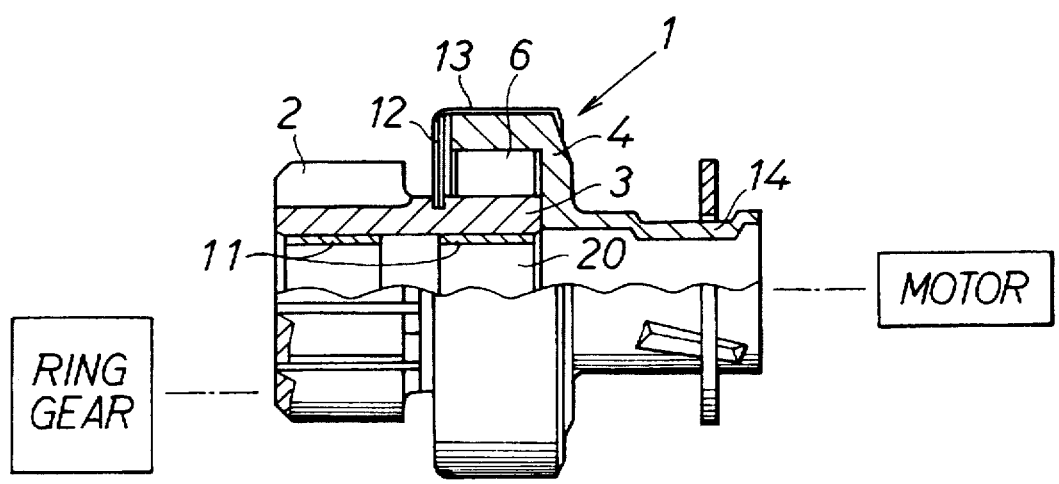
FIG. 2 is a sectional side view showing the one-way clutch according to the first embodiment.

In the first embodiment shown in FIGS. 1 and 2, a one-way clutch 1 is used in a starter which is provided with an unshown speed reduction mechanism and transmits the rotational force of an unshown motor to a pinion 2 through the reduction mechanism so as to start the engine of a car.

The one-way clutch 1 comprises an inner member 3 formed integrally with the pinion 2 which engages a ring gear of the engine flywheel; an outer member 4 positioned around the periphery of the inner member 3 and rotatable relatively to the inner member 3; a plurality of rollers 6 each accommodated in a tapered cam chamber 5 formed on the inner peripheral surface of the outer member 4; and a plurality of compression coil springs 8 each accommodated in a spring-accommodating chamber 7 formed on the inner peripheral surface of the outer member 4 as a continuation of the tapered cam chamber 5.

Through the rollers 6, the inner member 3 receives the rotational torque of the motor transmitted to the outer member 4. The inner member 3 is installed around an output shaft 20 of the reduction mechanism through a sleeve bearing 11 and is rotatable independently of the rotation of the output shaft 20 and slidable along the output shaft 20.

The pinion 2 integral with the inner member 3 transmits the rotational torque of the motor transmitted to the inner member 3 to the ring gear of the engine. Similarly to the inner member 3, the pinion 2 is installed around the periphery of the output shaft 20 of the reduction mechanism through the sleeve bearing 11 and rotatable independently of the rotation of the output shaft 20 and slidable along the output shaft 20. The pinion 2 slides along the output shaft 20 together with the inner member 3, for engagement with the ring gear of the engine at the time of cranking the engine.

The outer member 4 slides along the output shaft 20 of the reduction mechanism together with the inner member 3 through a washer 12 and a cover 13. The outer member 4 engages the output shaft 20 of the reduction mechanism through a spline engagement portion 14, thus receiving the rotational torque of the motor from the output shaft 20. An unshown lever is operated to slide the outer member 4 along the output shaft 20.

The diameter of each roller 6 accommodated in the cam chamber 5 is larger than the smallest radial length of a wedge-shaped space formed between the outer member 4 and the inner member 3 and smaller than the largest radial length therebetween. The roller 6 is cylindrical and urged toward the smallest radial length side of the wedge-shaped space, namely, in the taper-off side of the cam chamber 5.

Upon receipt of the rotational torque of the motor from the output shaft 20 of the reduction mechanism, the outer member 4 rotates in a direction shown by an arrow A of FIG. 1. As a result, each roller 6 is moved to a radially shorter-length side (hereinafter referred to as shorter-length side which is circumferentially opposite to the spring chamber 7) of the cam chamber 5 and engages the radially outer peripheral surface of the inner member 3 and the radially inner peripheral surface of the outer member 4, thus transmitting the rotational torque to the inner member 3.

Upon receipt of the rotational torque from the engine, the inner member 3 rotates in a direction shown by an arrow B. As a result, each roller 6 disengages from the outer peripheral surface of the inner member 3 and the inner peripheral surface of the outer member 4, thus moving to the predetermined position of the cam chamber 5 having a radial length larger than the diameter of the roller 6. Consequently, the inner member 3 idles, thus preventing the rotational torque from the engine from being transmitted to the motor side.

Each compression coil spring 8 accommodated in the spring-accommodating chamber 7 communicating with the cam chamber 5 urges the corresponding roller 6 to the shorter-length side of the cam chamber 5.

One end, of the compression coil spring 8, opposed to the other end thereof in contact with the roller 6 (hereinafter referred to as one end of the compression coil spring 8) is in contact with a seat 15 of the outer member 4 forming the spring-accommodating chamber 7.

An outer curved surface 15a directed radially inwardly is formed at the radially outer side of the seat 15. The radial length of the outer curved surface 15a in a circular arc shape is larger than the wire diameter of the compression coil spring 8.

A projection 16 directed toward the roller 6 is formed at the radially inner side of the seat 15. The maximum length between the seat 15 and the edge of the roller 6 at the seat-positioned side is x, whereas the length between the seat 15 and the projection 16 is y.

Owing to the formation of the projection 16, an inner curved surface 16a directed radially outwardly is formed at the radially inner side of the seat 15. Similarly to the outer curved surface 15a, the radial length of the inner curved surface 16a in a circular arc shape is larger than the wire diameter of the compression coil spring 8. That is, one end of the compression coil spring 8 is movably sandwiched between the outer curved surface 15a and the inner curved surface 16a.

The one-way clutch according to the first embodiment operates as described below.

For engine cranking, an unshown starter switch is turned on to drive the motor. The rotational torque of the motor drives the output shaft 20 of the unshown reduction mechanism. As a result, the outer member 4 rotates in the direction shown by the arrow A in FIG. 1 because the outer member 4 is in engagement with the output shaft 20 through the spline engagement portion 14. Consequently, each roller 6 moves away from the spring chamber 7 toward the shorter-length side of the cam chamber 5, thus operatively connecting the inner member 3 and the outer member 4 to each other. Therefore, the rotational torque of the motor transmitted to the outer member 4 is transmitted to the pinion 2 through the inner member 3.

At this time, through the rollers 6, the outer member 4 receives the torque of the motor applied to the pinion 2. In this instance, a stress tends to concentrate on thin parts of the outer member 4 between the cam chamber and the peripheral surface of the outer member 4. However, because the outer curved surface 15a having a greater length than the diameter of the compression coil spring 8 is formed on the radially outer side of the seat 15, the part of the outer member 4 between the seat 15 and the peripheral surface of the outer member 4 can be formed thick enough to prevent the stress from being concentrated thereon.

Upon start of the engine, the pinion 2 receives the rotational torque of the engine through the ring gear. As a result, the inner member 3 rotates in the direction shown by the arrow B of FIG. 1 through the pinion 2. Consequently, each roller 6 moves to a radially longer-length side (hereinafter referred to as longer-length side) of the cam chamber 5, thus idling the inner member 3. Thus, the rotational torque of the inner member 3 is not transmitted to the outer member 4. In this manner, the motor can be prevented from being driven by the engine.

When the compression coil spring 8 is compressed due to the movement of the roller 6 to the longer-length side of the cam chamber 5, the outer curved surface 15a applies a force to the compression coil spring 8 in a direction in which one end thereof is moved toward the inner member 3. The projection 16 directed toward the roller 6 is formed at the radially inner side of the seat 15 which is in contact with one end of the compression coil spring 8. Thus, even though the outer curved surface 15a applies a force directed in the above-described direction to the compression coil spring 8, the projection 16 prevents one end of the compression coil spring 8 from moving toward the inner member 3. Accordingly, the compression coil spring 8 is prevented from interfering with the inner member 3.

The outer curved surface 15a and the inner curved surface 16a both in the shape of a circular arc are so positioned that they sandwich one end of the compression coil spring 8 therebetween. Therefore, when the compression coil spring 8 is expanded due to the movement of the roller 6 toward the shorter-length side of the cam chamber 5, one end of the compression coil spring 8 moves toward the radially outer side of the seat 15, whereas when the compression coil spring 8 is contracted due to the movement of the roller 6 toward the longer-length side of the cam chamber 5, one end of the compression coil spring 8 moves toward the radially inner side of the seat 15. That is, one end of the compression coil spring 8 moves along the seat 15, with the axis of the compression coil spring 8 urging the center of the roller 6. That is, the compression coil spring 8 urges the roller 6 stably and uniformly according to the position of the roller 6.

Further, this construction prevents the other end of the compression coil spring 8 from inclining greatly with respect to the center of the roller 6 irrespective of the position of the roller 6, thus preventing the compression coil spring 8 from being caught between the roller 6 and the outer peripheral surface of the inner member 3 as well as the inner peripheral surface of the outer member 4.

Figure 6:
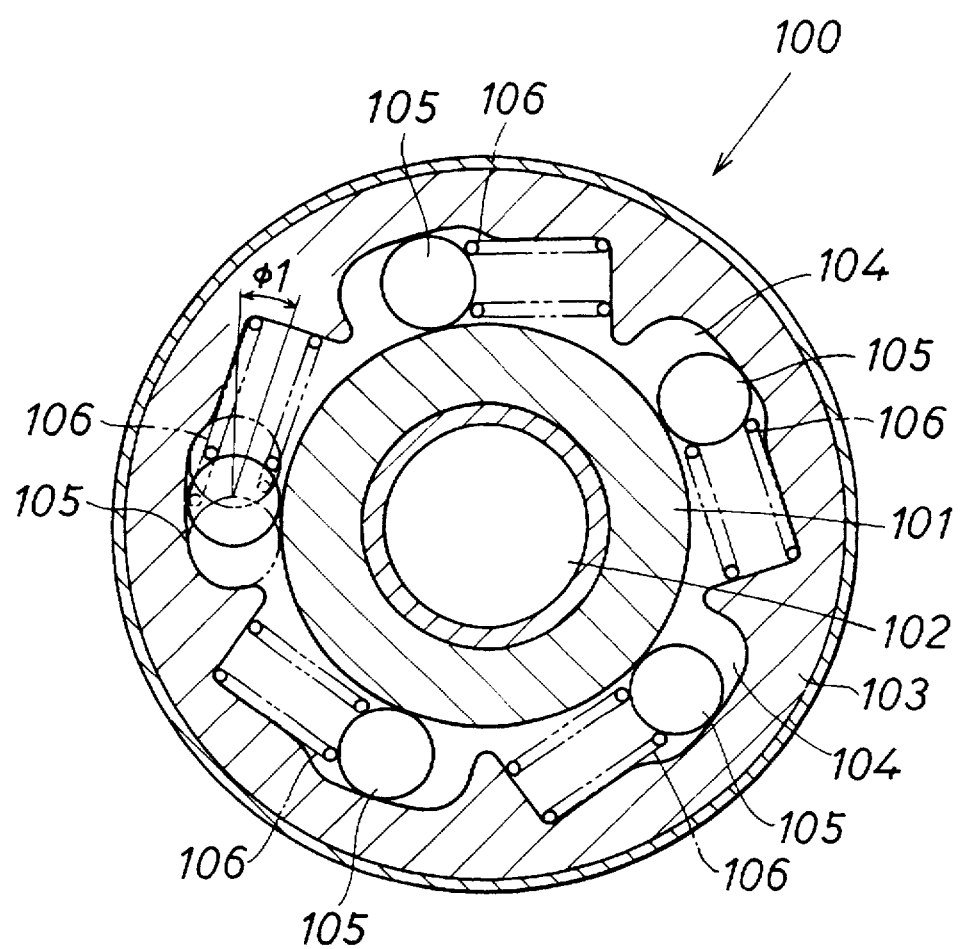
FIG. 6 is a sectional view of a conventional one-way clutch taken vertically to the axis.

Further, because the axis of the compression coil spring 8 is coincident with the center of the roller 6, the angle φ made between the movement direction of the center of the roller 6 and the axis of the compression coil spring 8 is greater than the angle φ 1 made between the movement direction of the center of the roller 105 and the axis of the compression coil spring 106 in the conventional one-way clutch shown in FIG. 6. Thus, the part of the outer member 4 forming the spring-accommodating chamber 7 can be thick and thus, has a high degree of strength.

As described above, in the one-way clutch 1, the formation of the outer curved surface 15a allows the thin part of the outer member 4 between the seat 15 and the peripheral surface of the outer member 4 to be thick, thus preventing the stress from being concentrated thereon. Further, the part of the outer member 4 surrounding the spring-accommodating chamber 7 can be formed thick and thus, has a high degree of strength, which contributes to the production of the outer member 4 compact and light.

Although the outer curved surface 15a applies a force to one end of the compression coil spring 8 in a direction in which one end thereof is moved toward the inner member 3, the projection 16 prevents one end thereof from being moved to the inner member 3, thus preventing the compression coil spring 8 from interfering with the inner member 3.

In the first embodiment, the outer curved surface 15a and the inner curved surface 16a both in the shape of a circular arc sandwich one end of the compression coil spring 8 therebetween, and one end of the compression coil spring 8 is movable on the seat 15. Thus, when the roller 6 moves in the tapered cam chamber 5, the axis of the compression coil spring 8 is coincident with the center of the roller 6. Consequently, irrespective of the position of the roller 6 which moves in the cam chamber 5 in the circumferential direction of the one-way clutch 1, the compression coil spring 8 is capable of urging the roller 6 stably and uniformly.

[Second Embodiment]

Figure 3:
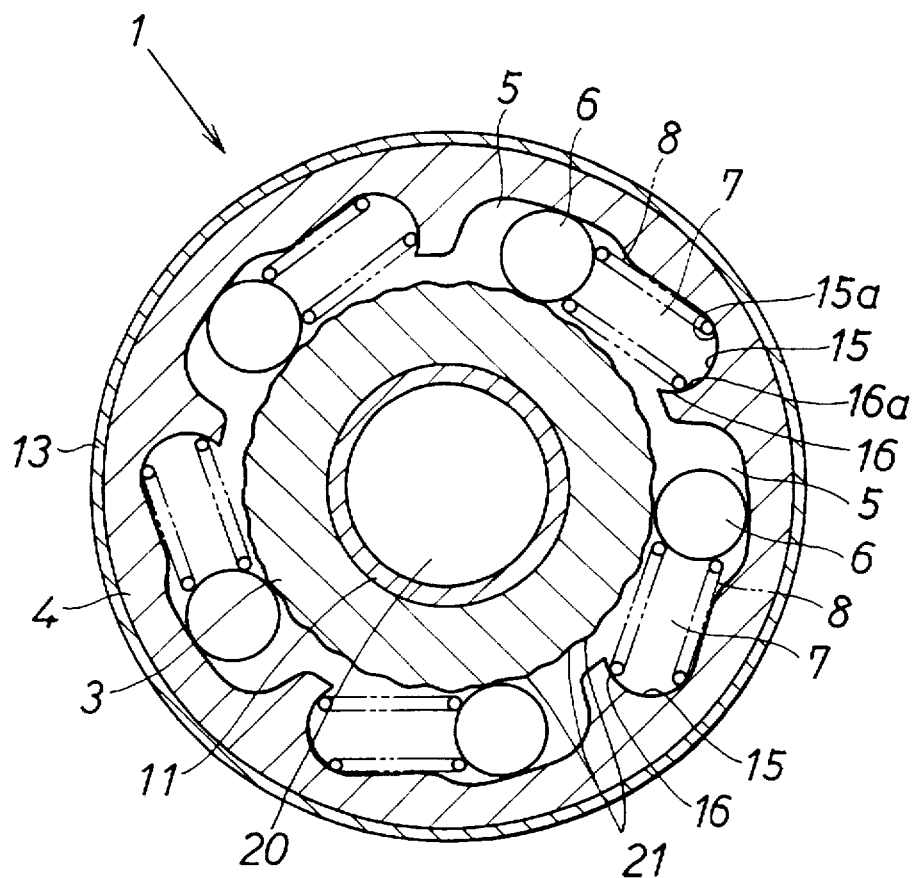
FIG. 3 is a sectional view of a one-way clutch taken vertically to the axis according to a second embodiment.

In the second embodiment shown in FIG. 3, a large number of irregularities 21 is formed on the radially outer peripheral surface of the inner member 3. The irregularities 21 reduce a load to be applied to the outer member 4 by the rollers 6 and serves as a means for reducing a stress which concentrates on the seat 15. Thus, the compact and light outer member 4 can be manufactured.

Because the projection 16 prevents the compression coil spring 8 from interfering with the inner member 3, there is no possibility that the compression coil spring 8 engages the irregularities 21 of the inner member 3. Therefore, the one-way clutch 1 of the second embodiment can be reliably used.

[Third Embodiment]

Figure 4:
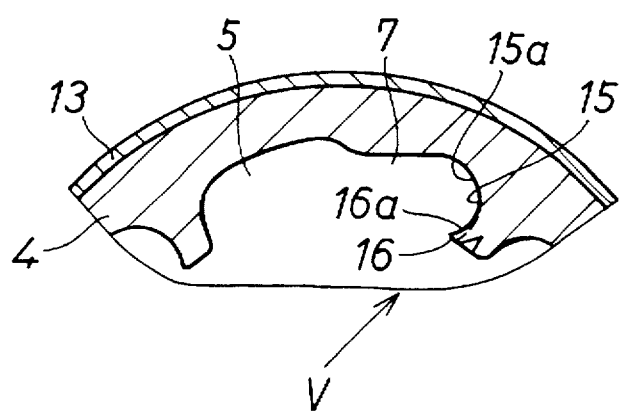
FIG. 4 is a partial view showing an outer member of a one-way clutch according to a third embodiment.
Figure 5:
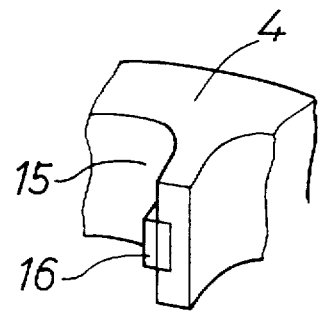
FIG. 5 is a view showing the main portion of the one-way clutch viewed in a direction V in FIG. 4.

In a third embodiment shown in FIGS. 4 and 5, projection 16 is formed by a simple machining technique. More specifically, a part of the radially inner side of the seat 15 is caulked to form the projection 16.

[Modification]

In the first through third embodiments, the present invention is applied to the one-way clutch 1 of the starter. In addition, the present invention may be used as a one-way clutch to be mounted between a stator of a torque converter of an automatic speed change gear and a stator shaft of the torque converter or between a gear and a shaft of a transmission so that it serves as a speed changing means.

Further, the present invention may be applied to other devices or apparatuses.

What is claimed is:

1. A one-way clutch comprising:

an inner member disposed rotatably;

an outer member disposed around a periphery of the inner member to be relatively rotatably against the inner member and having a plurality of tapered cam chambers formed on an inner peripheral surface thereof and a plurality of spring-accommodating chambers communicating respectively with the cam chambers;

a plurality of rollers accommodated respectively in wedge-shaped spaces defined by the cam chambers and the inner member;

a plurality of compression coil springs accommodated respectively in the spring-accommodating chambers for urging the rollers toward a radially shorter-length side of the cam chambers;

each of the spring-accomodating chambers having a seat defined by a curved surface formed on the inner peripheral surface and inclined radially inwardly on a radially outer side with respect to an expansion/contraction direction of each compression coil spring to receive one end of each compression coil spring movably thereon; and projections formed on the inner peripheral surface at a position radially inside the seat and projecting in the expansion/contraction direction of each compression coil spring.

2. The one-way clutch according to claim 1, wherein:

the curved surface has a curvature greater than a wire diameter of the compression coil spring at the radially outer and inner sides of the seat; and the curved surface and the projection sandwiches the one end of each compression coil spring therebetween.

3. The one-way clutch according to claim 1, wherein:

the inner member is formed with irregularities on the peripheral surface of thereof for locking the rollers thereto.

4. The one-way clutch according to claim 2, wherein:

the inner member is formed with irregularities on the peripheral surface of thereof for locking the rollers thereto.

5. The one-way clutch according to claim 1, wherein:

each of the projections is formed on only a part of the inner peripheral surface of the outer member at a position radially inside the seat.

6. The one-way clutch according to claim 2, wherein:

each of the projections is formed on only a part of the inner peripheral surface of the outer member at a position radially inside the seat.

7. The one-way clutch according to claim 3, wherein:

each of the projections is formed on only a part of the inner peripheral surface of the outer member at a position radially inside the seat.

8. The one-way clutch according to claim 1, wherein:

the one-way clutch is used in a starter having a speed reduction mechanism.

9. A device for an engine comprising:

a motor having a rotary output shaft;

a clutch inner member formed with a pinion for engagement with a ring gear of an engine flywheel;

a clutch outer member disposed around the clutch inner member and driven by the output shaft, the clutch outer member being formed with a pair of cam chamber and a spring chamber on a radially inner side thereof and a projection on a radially innermost side thereof, the spring chamber having at a circumferential end thereof a seat formed in an arc shape to slope radially inwardly at a radially outermost portion thereof, the projection extending from the seat toward the cam chamber;

a roller disposed movably in the cam chamber for regulating movement of the inner and the outer members; and a spring disposed in the spring chamber to bias the roller away from the spring chamber and having a first end contacting the roller and a second end received movably on the seat so that radial movement of the second end being restricted by the projection.

* * * * *